United States Patent [19]

Moore et al.

[11] Patent Number: 4,928,275
[45] Date of Patent: May 22, 1990

[54] SYNCHRONIZATION OF ASYNCHRONOUS DATA SIGNALS

[75] Inventors: Thomas E. Moore, Edmonton; James A. McEachern, Kanata; Mark S. Wight, Ottawa, all of Canada

[73] Assignee: Northern Telecom Limited, Montreal, Canada

[21] Appl. No.: 357,244

[22] Filed: May 26, 1989

[51] Int. Cl.[5] .............................................. H04J 3/07
[52] U.S. Cl. ...................................... 370/102; 375/118
[58] Field of Search ....................... 370/102, 100, 105; 325/118, 111, 112

[56] References Cited

U.S. PATENT DOCUMENTS

| | | | |
|---|---|---|---|
| 4,397,017 | 8/1983 | Rokugo | 370/102 |
| 4,667,324 | 5/1987 | Graves | 370/102 |
| 4,674,088 | 6/1987 | Grover | 370/102 |
| 4,757,452 | 7/1988 | Scott et al. | 370/102 |
| 4,764,942 | 8/1988 | Shigaki et al. | 370/105 |
| 4,791,652 | 12/1988 | McEachern et al. | 375/111 |
| 4,811,340 | 3/1989 | McEachern et al. | 370/102 |
| 4,823,365 | 4/1989 | Loginov | 375/118 |
| 4,847,875 | 7/1989 | Choi | 370/102 |

Primary Examiner—Douglas W. Olms
Assistant Examiner—Alpus H. Hsu
Attorney, Agent, or Firm—R. John Haley

[57] ABSTRACT

A method of and apparatus for synchronizing an asynchronous DS1 signal to produce a synchronized signal in the SONET format is described. The asynchronous signal is stuffed in dependence upon a stuff request signal which is produced from a comparison with a threshold level of a phase difference between read and write phases with which the synchronized and asynchronous signals are respectively read from and written into an elastic store. The phase detection and threshold comparison are effected synchronously with the respective signals. To this end, the read address for the store is latched in synchronism with the synchronized frames, and its difference from the write address and the resulting threshold level comparison is effected in synchronism with the write clock for the store and hence with the asynchronous signal. The synchronizer provides a reduced waiting time jitter in the synchronized signal.

8 Claims, 1 Drawing Sheet

SYNCHRONIZATION OF ASYNCHRONOUS DATA SIGNALS

This invention relates to the synchronization of asynchronous data signals, and is particularly concerned with the production of stuff requests for such synchronization.

BACKGROUND OF THE INVENTION

It has long been known to use stuffing techniques in order to produce a data signal, which is synchronized to a local clock frequency, from an incoming data signal which is asynchronous to the local clock frequency. The synchronized data signal can then conveniently be switched or multiplexed and transmitted with other, similarly synchronized, data signals. For example, an asynchronous DS1 data signal, having a nominal frequency of 1.544Mb/s, may be converted by positive stuffing into a synchronized data signal with a higher frequency than this.

In order to determine when stuffing of data bits is to be effected, it is well known to write the incoming asynchronous data into a cyclic buffer or elastic store, to read the data from the buffer at a slightly later time, and to compare the phase difference between the read and write positions with a threshold level, producing a stuff request signal when the threshold level is exceeded. Data is then stuffed at the next stuffing opportunity, whereby the phase difference no longer exceeds the threshold level. The phase difference determination and threshold level comparison are typically achieved in a very simple manner, for example using only a single flip-flop or a simple logic circuit.

Synchronous communications networks, using the so-called SONET format, are becoming of increasing importance for the communication of data signals. In the SONET format a so-called STS-1 signal having a bit rate of 51.84Mb/s can accommodate 28 DS1 data signals, which are multiplexed together with overhead information in a byte-interleaved manner. Where the DS1 signals are asynchronous, they must be synchronized before being multiplexed.

In this situation, however, a problem arises in the synchronization process due to the relatively large amount of overhead information in the SONET frame, and the concentration of this overhead information due to byte interleaving, in that the synchronized DS1 signals, produced using known forms of synchronizer as described above, contain unacceptably large amounts of so-called waiting time jitter. This problem has not been recognized hitherto, because in conventional communications networks (e.g. in which DS1 signals are multiplexed to produce DS2 and DS3 signals) there is relatively little overhead information and it is well distributed, so that the waiting time jitter which does occur is well within allowed limits.

In McEachern et al. U.S. Pat. No. 4,791,652 issued Dec. 13, 1988 and No. 4,811,340 issued Mar. 7, 1989, both entitled "Synchronization of Asynchronous Data Signals", there are described methods and apparatus for synchronizing asynchronous data signals for transmission via a SONET communications network. Even using these techniques, however, the waiting time jitter of synchronized DS1 signals can exceed limits which are imposed by existing communications equipment, with which the SONET communications network must interface.

An object of this invention, therefore, is to provide an improved synchronizing method and apparatus in which this problem is reduced or substantially avoided.

SUMMARY OF THE INVENTION

According to this invention there is provided a method of synchronizing an asynchronous signal to produce a synchronized signal by stuffing the asynchronous signal in dependence upon a stuff request signal produced from a comparison with a threshold level of a phase difference between read and write phases with which the synchronized and asynchronous signals are respectively read from and written into a store, wherein the read phase is determined in synchronism with a time division multiplex frame of the synchronized signal, and the phase difference is determined in synchronism with a write clock for the store.

Preferably the read phase is determined by latching a read address for the store in synchronism with a read clock for the store at a predetermined time during the frame of the synchronized signal, and the phase difference is subsequently determined from a difference between a write address for the store and the latched read address. The stuff request signal is preferably produced in synchronism with the frame of the synchronized signal.

The method of the invention thereby performs a phase detection and threshold level comparison which is at all times maintained in synchronism with the respective signals, even though these are asynchronous with respect to one another, whereby the waiting time jitter discussed above is reduced to a low level.

The invention also provides synchronizing apparatus comprising: a store; means for writing data of an asynchronous signal into the store at a write address and means for reading data from the store at a read address to produce a synchronized data signal; means for latching the read address in synchronism with a time division multiplex frame of the synchronized signal; means responsive to a difference between the write address and the latched read address for producing a stuff request signal; and means responsive to the stuff request signal for providing stuffed information in the synchronized signal.

Conveniently the means responsive to the difference between the write address and the latched read address comprises subtracting means for producing a binary signal dependent upon the difference between the write and read addresses relative to a threshold level, means for latching the binary signal in synchronism with the writing of data in the store, and means for latching the latched binary signal in synchronism with the frame of the synchronized signal to produce the stuff request signal. Each means for latching the binary signal preferably comprises an edge-triggered flip-flop.

BRIEF DESCRIPTION OF THE DRAWINGS

The invention will be further understood from the following description with reference to the accompanying drawings, in which similar references are used in different figures to denote similar components and in which.

DESCRIPTION OF THE PRIOR ART

Figure 1:
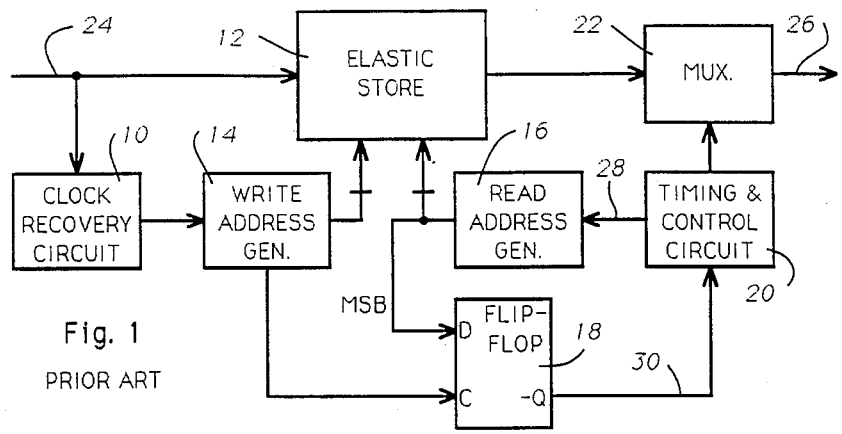
FIG. 1 is a block diagram illustrating a known form of synchronizer.

Referring to FIG. 1, a known form of synchronizer comprises a clock recovery circuit 10, a cyclic buffer or elastic store 12, a write address generator 14, a read address generator 16, a phase detector and threshold level comparator constituted by a D-type flip-flop 18, a timing and control circuit 20, and a multiplexer 22. The synchronizer serves to convert an asynchronous DS1 data signal incoming on a line 24 into a synchronized data signal on a line 26, multiplexed with other DS1 signals (not shown) which are each synchronized in the same manner. The multiplexer 22 effects positive stuffing under the control of stuff control signals supplied thereto by the timing and control circuit 20, and also multiplexes overhead information into the data signal on the line 26. The circuit 20 produces on a line 28 a gapped read clock which is synchronously related to the timing of a SONET network via which the synchronized and multiplexed data is to be transmitted, and produces the stuff control signals for the multiplexer 22 in response to stuff requests supplied thereto from the flip-flop 18 via a line 30.

The asynchronous data is written into the store 12 at addresses supplied by the write address generator 14, which is supplied with a recovered clock signal produced by the clock recovery circuit 10 from the asynchronous data bit stream on the line 24, and is read from the store 12 to the multiplexer 22 under the control of the read address generator 16 supplied with the read clock signal from the circuit 20. For example, the elastic store 12 may have a storage capacity of 32 bits, and the address generators 14 and 16 may comprise modulo-32 counters having 5-bit outputs which are used for addressing the store 12. In order to determine when a stuff is necessary, the flip-flop 18 has the most significant bit (MSB) of the read address supplied to its data input D, and is clocked via its clock input C by an output from the write address generator 14 when this reaches its mid-count (i.e. 16). The -Q output of the flip-flop 18 then constitutes the stuff request signal on the line 30.

Because of the asynchronous timing of the incoming DS1 data signal on the line 24, phase comparisons which are effectively made by the flip-flop 18 do not occur at precisely the same instants in each synchronized frame. The only phase detection and threshold level comparison which is of significance for the stuffing process is that which occurs last before the first 'C' bit, or stuff indication bit, in the respective frame. The asynchronous clocking of the flip-flop 18 means that this comparison can occur at any instant within a time interval or window of the synchronized signal frame. The size of this window is a function of the size of the elastic store 12 and the amount of overhead information in the synchronized data on the line 26. For practical synchronization of a DS1 signal into the SONET format the window is sufficiently large that the consequent waiting time jitter is beyond acceptable limits.

DESCRIPTION OF THE PREFERRED EMBODIMENT

Figure 2:
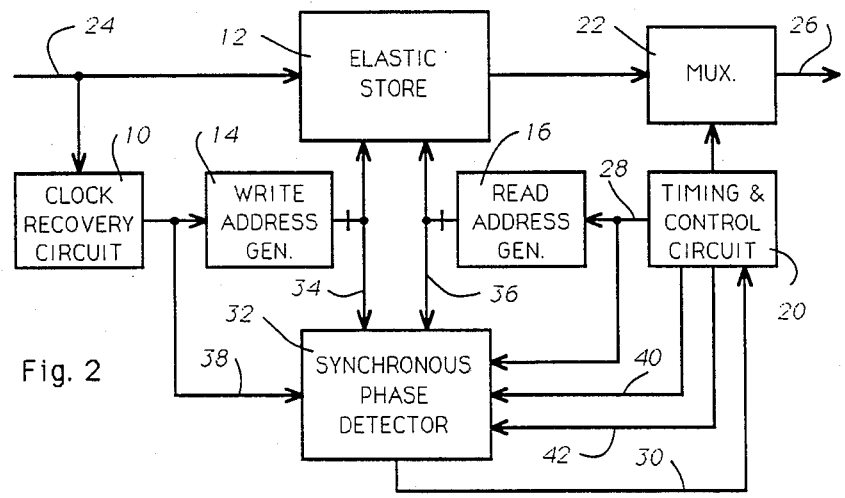
FIG. 2 is a block diagram illustrating a synchronizer in accordance with an embodiment of this invention.

FIG. 2 illustrates a synchronizer in accordance with an embodiment of this invention in which this disadvantage is substantially eliminated. In the following description, only the differences between the synchronizer of FIG. 2 from that of FIG. 1 are described.

Figure 3:
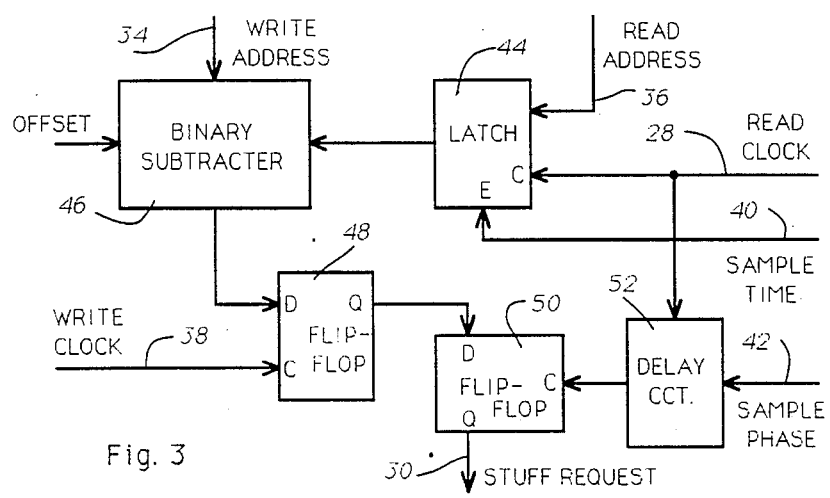
FIG. 3 illustrates a phase detector which is used in the synchronizer of FIG. 2.

In the synchronizer of FIG. 2, the flip-flop 18 of FIG. 1 is replaced by a synchronous phase detector 32, a preferred form of which is illustrated in FIG. 3. The synchronous phase detector 32 is supplied with the full write address from the write address generator 14 via lines 34, the full read address from the read address generator 16 via lines 36, the recovered write clock from the clock recovery circuit 10 via a line 38, the read clock from the line 28, a sample time control signal from the circuit 20 via a line 40, and a sample phase control signal from the circuit 20 via a line 42. The phase detector supplies the stuff request signal to the circuit 20 via the line 30, as in the synchronizer of FIG. 1.

Referring to FIG. 3, the synchronous phase detector 32 comprises a read address latch 44, a binary subtracter 46, two edge-triggered D-type flip-flops 48 and 50, and a delay circuit 52. The latch 44 has a clock input C to which the read clock from the line 28 is supplied, a latch enable input E to which the sample time control signal on the line 40 is supplied, and data inputs to which the read address is supplied from the lines 36. The binary subtracter 46 is supplied with the output of the latch 44, the write address from the lines 34, and an offset which is discussed below. The offset may be provided as a signal to the subtracter 46, or it may be provided by the physical configuration of the subtracter. The subtracter provides a one-bit output which is supplied to the data input D of the flip-flop 48, to the clock input C of which the write clock on the line 38 is supplied. The Q output of the flip-flop 48 is supplied to the data input D of the flip-flop 50, the Q output of which constitutes the stuff request signal on the line 30. The flip-flop 50 is clocked at its clock input C by the output of the delay circuit 52, which is supplied with the read clock from the line 28 and the sample phase control signal on the line 42.

By way of example, in the synchronizer of FIGS. 2 and 3 the store 12 may have a storage capacity of 40 bits, the generators 14 and 16 being modulo-40 counters with 6-bit outputs, and the binary subtracter 46 may correspondingly be a modulo-40 subtracter having 6-bit inputs. The timing and control circuit 20 may supply the sample time control signal at a predetermined instant in each synchronized data frame, for example at a given number of bit periods following the so-called I-bit of the synchronized data signal in the SONET format. This I-bit is described for example in U.S. Pat. No. 4,791,652 already referred to. This given number of bit periods, or unit intervals, is selected to be in advance of a desired synchronous phase comparison time (in the synchronized data frame, before the first 'C' or stuff indication bit in the frame) by an offset amount of, for example, 4 unit intervals. This offset amount is the same as the offset referred to above for the subtracter 46, in which compensation for this advancement is made.

The sample phase control signal is provided by the circuit 20 with a timing which is varied by one quarter of a unit interval in successive cycles of four frames, thereby to variably control the triggering of the flip-flop 50 and hence distribute the production of stuff requests at the output of this flip-flop among frames, in the manner and for the reasons described in U.S. Pat. No. 4,791,652 already referred to. In this respect it is observed that this timing or phase variation is directly equivalent to the threshold variation specifically described in the aforementioned patent.

In operation, the read address on the lines 36 is latched by the latch 44 at the sample time at which it is enabled via the line 40, synchronously under the control of the read clock from the line 28. The latched read address, modified by the compensating offset of four unit intervals provided to or within the binary subtracter 46, is subtracted from the write address on the lines 34 by the subtracter 46. The most significant bit of the subtracter output constitutes the output of the subtracter. This bit is clocked through the flip-flop 48 in synchronism with the write clock, and hence in accordance with the (asynchronous) timing of the incoming DS1 signal. The offset amount of four unit intervals discussed above provides an adequate time for performing the subtraction and stabilization of the outputs of the latch 44 and the subtracter 46.

The phase detection output of the flip-flop 48 is finally clocked through the flip-flop 50, in synchronism with the read clock as modified by the delay circuit 52 by the quarter unit interval steps as described above, to produce the stuff request signal on the line 30 in synchronism with the SONET frames controlled by the circuit 20.

Thus it can be seen that the phase detector operates in a fully synchronous manner for both the read and write phases, even though these are asynchronous with respect to one another. More specifically, the read address is latched, and the stuff request signal is produced, synchronously with the read address generation, in that the latch 44 and the flip-flop 50 are clocked in dependence upon the read clock. In addition, the phase detection and threshold comparison performed by the binary subtracter 46 are arranged to take effect synchronously with the incoming DS1 signal, in that the flip-flop 48 is clocked in dependence upon the write clock.

It has been determined that, in a SONET synchronizer in accordance with the prior art as shown in FIG. 1, the waiting time jitter in the synchronized DS1 signal can be a maximum of about 2.4 UI p-p (unit intervals, peak-to-peak), which is well in excess of the required maximum of 1.0 UI p-p. Using a synchronizer in accordance with this invention and as described above with reference to FIGS. 2 and 3, the maximum waiting time jitter is reduced to about 0.4 UI p-p or less.

Although the above description relates specifically to synchronization of an asynchronous DS1 signal to the SONET format, the invention is not limited thereto but is more generally applicable to the synchronization of any asynchronous signal. In particular, the invention may be equally applied to the synchronization of an asynchronous DS3 signal at a nominal bit rate of 44.736Mb/s into the SONET format for producing an STS-1 signal. Furthermore, the invention may if desired be applied to the synchronization of signals to other formats, for example in producing a DS3 signal from multiple DS1 signals.

Numerous other modifications, variations, and adaptations may be made to the described embodiment without departing from the scope of the invention as defined in the claims.

What is claimed is:

1. A method of synchronizing an asynchronous signal to produce a synchronized signal by stuffing the asynchronous signal in dependence upon a stuff request signal produced from a comparison with a threshold level of a phase difference between read and write phases with which the synchronized and asynchronous signals are respectively read from and written into a store, wherein a read address for the store is determined in synchronism with a time division multiplex frame of the synchronized signal, and the phase difference is determined at a time synchronized to a write clock for the store.

2. A method as claimed in claim 1 wherein the is latched read address for the store in synchronism with a read clock for the store at a predetermined time during the frame of the synchronized signal, and the phase difference is subsequently determined from a difference between a write address for the store and the latched read address.

3. A method as claimed in claim 1 wherein the stuff request signal is produced in synchronism with the frame of the synchronized signal.

4. A method as claimed in claim 2 wherein the stuff request signal is produced in synchronism with the frame of the synchronized signal.

5. A method as claimed in claim 4 wherein the asynchronous signal comprises a DS1 signal.

6. Synchronizing apparatus comprising:
a store;
means for writing data of an asynchronous signal into the store at a write address and means for reading data from the store at a read address to produce a synchronized data signal;
means for latching the read address in synchronism with a time division multiplex frame of the synchronized signal;
means responsive to a difference between the write address and the latched read address for producing a stuff request signal; and
means responsive to the stuff request signal for providing stuffed information in the synchronized signal.

7. Apparatus as claimed in claim 6 wherein the means responsive to the difference between the write address and the latched read address comprises subtracting means for producing a binary signal dependent upon the difference between the write and read addresses relative to a threshold level, means for latching the binary signal in synchronism with the writing of data in the store, and means for latching the latched binary signal in synchronism with the frame of the synchronized signal to produce the stuff request signal.

8. Apparatus as claimed in claim 7 wherein each means for latching the binary signal comprises an edge-triggered flip-flop.

* * * * *